United States Patent Office 2,829,145
Patented Apr. 1, 1958

2,829,145
PRODUCTION OF TRYPTOPHAN

Ludwig G. Hartmann, Wilmington, Del., and Norman L. Hause, West Chester, Pa., assignors to E. I. du Pont de Nemours and Company, Wilmington, Del., a corporation of Delaware No Drawing. Application July 27, 1956
Serial No. 600,413

15 Claims. (Cl. 260—309.5)

This invention relates to a new method for synthesizing tryptophan.

Tryptophan is one of the essential amino acids. Various methods have been proposed for synthesizing it, but most such methods require the use of starting compounds which are expensive or not readily available.

It is an object of the invention to provide a new method for synthesizing tryptophan. A further object is to provide a method for its synthesis from readily available starting materials, or from materials which can readily be prepared by known methods. Still further objects will be apparent from the following description.

The objects of the invention are accomplished by condensing a 3-aminomethyl indole of the formula

I

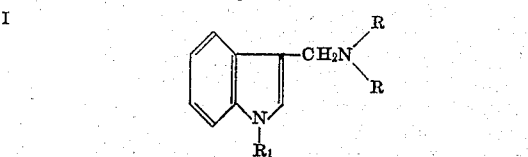

with a hydantoin of the formula

II

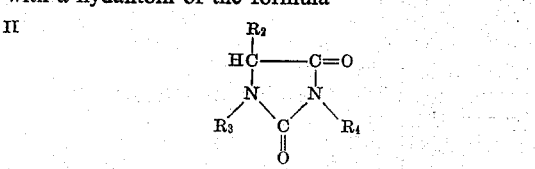

in the presence of a basic material and of an acid anhydride or an acid chloride of an organic carboxylic acid, and hydrolyzing the condensation product.

In the formula for reactant I, each R may be an alkyl, an aryl or an aralkyl radical, or the two together may constitute a polymethylene radical forming with the nitrogen atom a heterocyclic radical such as the piperidyl radical. Preferably, each R will be a lower (1 to 4 carbon) alkyl radical such as the methyl, ethyl, propyl and butyl radicals, although it may be higher alkyl radical such as the pentyl radicals, an aryl radical such as the phenyl radical, or an aralkyl radical such as the benzyl radical. Most preferably, each R will be methyl, in which case, reactant I will be 3-dimethylaminomethyl indole (when $R_1$ is hydrogen), more commonly called gramine, which is readily obtained from indole, formaldehyde and dimethylamine by the well known Mannich synthesis. $R_1$ in the formula may be either hydrogen or an acyl radical such as the formyl, acetyl, propionyl, butyryl and benzoyl radicals.

In the formula for reactant II, $R_2$ may be hydrogen, a carbalkoxyl radical, or an acyl radical, such as the acyl radicals mentioned above for $R_1$ in the formula for reactant I; and $R_3$ and $R_4$ each may be hydrogen or an acyl radical such as the acyl radicals mentioned above for $R_1$ in the formula for reactant I. $R_4$ may also be an alkyl radical such as the alkyl radicals mentioned above for R in the formula for reactant I. Most preferably, $R_2$, $R_3$ and $R_4$ will be hydrogen, in which case reactant II will be hydantoin which can be readily prepared by well-known methods, e. g. by the reaction of a cyanide, formaldehyde and ammonium carbonate.

The acid anhydride or acid chloride in whose presence the condensation between reactants I and II is carried out can be any acid anhydride or acid chloride of a carboxylic acid of the formula $$R_5\text{—COOH}$$

in which $R_5$ may be an alkyl, an aryl or an aralkyl radical. Examples are the methyl, ethyl, propyl and butyl radicals, and the phenyl and benzyl radicals. Preferably, $R_5$ will be a lower (1 to 4 carbon) alkyl radical and most preferably it will be methyl.

The alkaline material in whose presence the above condensation reaction is carried out and which catalyzes the reaction may be any inorganic base or any tertiary amine. Examples are the hydroxides of the alkali and alkaline earth metals, the salts of the alkali metal hydroxides with weak acids, e. g. sodium carbonate and sodium acetate; the alkali metal alcoholates e. g. sodium methylate and sodium ethylate; and the tertiary amines, e. g. trimethylamine, pyridine and diethylaniline. The preferred catalyst is sodium acetate.

When gramine and hydantoin are the starting materials, the production of tryptophan involves the following reactions:

(1)

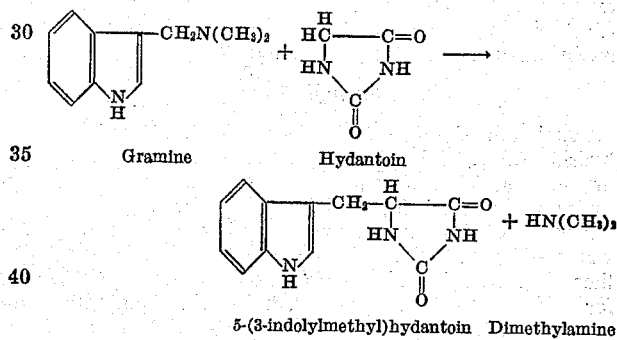

Gramine      Hydantoin 5-(3-indolylmethyl)hydantoin   Dimethylamine (2)

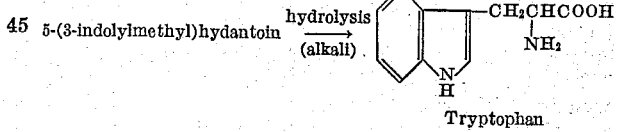

5-(3-indolylmethyl)hydantoin $\xrightarrow[\text{(alkali)}]{\text{hydrolysis}}$

Tryptophan

Since the presence of an acid anhydride or an acid chloride is essential in carrying out reaction (1), it is possible that the actual intermediate formed in the condensation is partially or completely acylated. Acylation of the dimethylamine by-product may also occur. However, the equation shown for reaction (1) represents the general type of reaction involved.

If instead of gramine, a compound of Formula I is used in which $R_1$ is an acyl radical, such radical will be hydrolyzed off and replaced by hydrogen during the hydrolysis reaction (2). The identity of the secondary amine by-product of reaction (1) will of course depend upon the identities of the R radicals of the reactant of Formula I. Thus, the secondary amine by-product will be dimethylamine when the R's are methyl, and diethylamine when the R's are ethyl.

If instead of being hydrogen, $R_2$, $R_3$ and $R_4$ in the reactant of Formula II are radicals of the type indicated previously, such radicals will be hydrolyzed or split off during the hydrolysis reaction (2), e. g. when $R_4$ is methyl as in 3-methyl hydantoin, methylamine will be formed during the hydrolysis. Thus, any of the reactants of Formula I can be reacted with any of the reactants of Formula II to yield an intermediate indolylmethyl hydantoin which hydrolyzes to tryptophan.

The invention is illustrated by the following examples.

*Example 1*

A mixture of 250 ml. of acetic anhydride, 25 g. of freshly fused sodium acetate, 41 g. of gramine and 25 g. of hydantoin was refluxed for 2 hrs. under vigorous stirring, then poured into water. The oil which separated was mixed with 200 g. of barium hydroxide $$(Ba(OH)_2 \cdot 8H_2O)$$

and 1.5 l. of water and the mixture was heated in a pressure tube for 1 hr. at 150° C. After cooling the contents of the tube, 84 g. of ammonium sulfate was added thereto and the precipitated barium sulfate was filtered off and washed with ammonium hydroxide. The combined filtrate and washings were concentrated under vacuum to 175 ml. and extracted with n-butanol. The crystalline product which separated at the interface during the extraction was collected and combined with the crystalline product obtained by concentrating and cooling the butanol extract. Recrystallization of the crystals from aqueous ethanol gave DL-tryptophan, M. P. 285–286° C., which analyzed as follows:

Calculated for $C_{11}H_{12}O_2N_2$: C, 64.69; H, 5.92. Found: C, 64.90; H, 5.73.

The product tryptophan had an Rf value corresponding to that for an authentic sample of tryptophan when analyzed by paper chromatography using the following solvent mixtures: (1) n-butanol-acetic acid-water (volume ratio of 11:3:4), (2) n-propanol-aqueous ammonia (28%)-isoamyl alcohol (6:3:1), and (3) t-butanol-methylethylketone-water (55:30:15).

*Example 2*

A mixture of 150 ml. of xylene, 95 ml. of acetic anhydride, 25 g. of freshly fused sodium acetate, 41 g. of gramine and 25 g. of hydantoin was refluxed for 4 hours under vigorous stirring. After evaporating the solvent under reduced pressure, the residual oil was washed with water and mixed with 226 g. of barium hydroxide and 1 liter of water. The mixture was heated in a pressure tube for 1 hr. at 150° C. then cooled. The barium sulfate precipitated by the addition of 95 g. ammonium sulfate was filtered off and washed with ammonium hydroxide. The combined washings and filtrate were concentrated under vacuum, extracted with 400 ml. to butanol and the butanol extract was concentrated under vacuum to about 200 ml., then placed in a refrigerator. The product crystals which separated were combined with a second crop obtained after concentrating the mother liquor. The combined product was analyzed by paper chromatography using an n-butanol-acetic acid-water (4:1:5) solvent mixture and found to be identical with an authentic sample of DL-tryptophan.

*Example 3*

Tryptophan was synthesized by condensing gramine with hydantoin and hydrolyzing the resulting mixture substantially as described in Example 1 except that diethylaniline was employed as the alkaline condensation catalyst in place of sodium acetate.

*Example 4*

Tryptophan was synthesized by condensing 3-indolylmethyldiethylamine (instead of gramine) with hydantoin and hydrolyzing the resulting mixture substantially as described in Example 1.

*Example 5*

Tryptophan was synthesized by condensing gramine with 3-methyl hydantoin (instead of hydantoin) and hydrolyzing the resulting mixture substantially as described in Example 1.

The condensation reaction (1) generally and preferably will be carried out employing the reactants in about equimolar proportions although an excess of either can be used. The amount of acid anhydride or acid chloride present should be substantially greater than one mole per mole of each of the reactants. Preferably, at least 2 moles of the anhydride will be used per mole of each reactant.

It is essential that the condensation be carried out in the presence of an alkaline material as catalyst, but the amount of catalyst used is not particularly critical. Generally, about 0.5 to 1 mole of the catalyst will be used per mole of reactant I.

Any inert anhydrous solvent in which the reactants are soluble can be employed as the reaction medium for the condensation reaction (1). Examples are xylene, toluene, dioxane, and the like. However, use of an inert solvent is not essential. If desired, an excess of the acid anhydride such as acetic anhydride can be employed as the reaction medium.

The condensation reaction (1) generally requires the use of elevated temperatures, those ranging from about 100 to 200° C. being generally suitable and those ranging from about 130 to 160 being preferred.

It is not essential that the intermediate indolylmethyl hydantoin be isolated prior to being hydrolyzed. In fact, it is generally preferred simply to evaporate solvent (if an inert solvent medium is used) from the condensation reaction mixture, then hydrolyze directly the residual mixture. Hydrolysis will generally be carried out by heating such a mixture, or the isolated indolylmethyl hydantoin, with water in the presence of an alkali such as an alkaline earth metal hydroxide, e. g. barium hydroxide, or an alkali metal hydroxide, e. g. sodium hydroxide. Generally, at least 1.5 and preferably 2 to 3 moles of the alkali will be employed per mole of the intermediate indolylmethyl hydantoin. Heating the mixture of the intermediate and the aqueous alkali to boiling, and preferably to temperatures ranging from about 125 to 225° C., e. g. under autogenous pressure, is generally preferred. The time of heating will vary with the temperature used, the higher the temperature the shorter the time required. At the preferred temperatures, heating times ranging from about 0.25 to 1 hr. are generally suitable.

Tryptophan can be recovered from the hydrolysis mixture by any of the common methods for recovering such products. If barium hydroxide is used in the hydrolysis, separation of barium from the mixture in the form of an insoluble salt, e. g. barium sulfate, is generally desirable, following which the tryptophan can be recovered by extraction or crystallization methods. If sodium hydroxide is used in the hydrolysis, the hydrolysis mixture will usually be neutralized by the addition of acid to precipitate the tryptophan.

The method of the invention provides a new and relatively simple two-step route to tryptophan starting with relatively cheap and readily obtainable raw materials.

We claim:

1. The method of synthesizing tryptophan comprising condensing a compound of the formula (I)
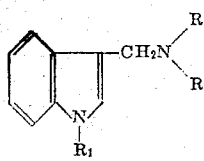

with a compound of the formula (II)
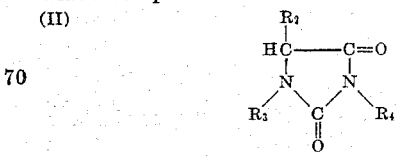

in the presence of a basic catalyst and of a compound of the group consisting of the acid anhydrides and acid chlorides of organic carboxylic acids, and hydrolyzing the resulting intermediate 3-indolylmethyl hydantoin; in which Formula I and R radicals are from the group consisting of the alkyl, aryl and aralkyl radicals, and in which both R's together may constitute a polymethylene radical forming, with the nitrogen atom to which they are attached, a heterocyclic ring; $R_1$ in Formula I being from the group consisting of hydrogen and acyl radicals; $R_2$ in Formula II being from the group consisting of hydrogen, the carbalkoxyl radical and acyl radicals; $R_3$ in Formula II being from the group consisting of hydrogen and acyl radicals; and $R_4$ in Formula II being from the group consisting of hydrogen, alkyl and acyl radicals.

2. The method of claim 1 wherein the compound of Formula I is gramine.

3. The method of claim 1 wherein the compound of Formula II is hydantoin.

4. The method of claim 1 wherein the compound of Formula I is gramine and the compound of Formula II is hydantoin.

5. The method of claim 1 employing at least 2 moles of the compound from the group consisting of the acid anhydrides and acid chlorides per each mole of the compounds of Formula I and II.

6. The method of claim 5 employing acetic anhydride and sodium acetate.

7. The method of synthesizing tryptophan comprising heating together gramine and hydantoin to a temperature from 100 to 200° C. in the presence of a basic catalyst and of a compound of the group consisting of the acid anhydrides and acid chlorides of organic carboxylic acids, and hydrolyzing the resulting intermediate 5-(3-indolylmethyl) hydantoin.

8. The method of claim 7 wherein the hydrolysis is effected by heating the intermediate 5-(3-indolylmethyl) hydantoin with aqueous alkali at a temperature from 125 to 225° C.

9. The method of synthesizing tryptophan comprising heating together gramine and hydantoin to a temperature of 130 to 160 in the presence of a basic catalyst and of at least 2 moles of acetic anhydride per each mole of gramine and hydantoin, and hydrolyzing the resulting mixture.

10. The method of synthesizing tryptophan comprising heating together gramine and hydantoin to a temperature of 130 to 160 in the presence of sodium acetate and of at least 2 moles of acetic anhydride per each mole of gramine and hydantoin, and hydrolyzing the resulting mixture by heating it with aqueous alkali to a temperature from 125 to 225° C.

11. The method of synthesizing tryptophan comprising condensing gramine with hydantoin in the presence of a basic catalyst and of a compound from the group consisting of the acid anhydrides and the acid chlorides of organic carboxylic acids, and hydrolyzing the resulting condensation product.

12. The method of preparing a 3-indolylmethyl hydantoin comprising condensing a compound of the formula (I) 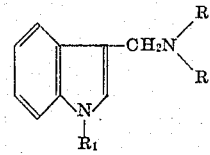

with a compound of the formula (II) 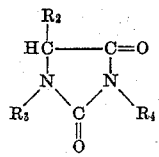

in the presence of a basic catalyst and a compound of the group consisting of the acid anhydrides and acid chlorides of organic carboxylic acids; in which Formula I the R radicals are from the group consisting of the alkyl, aryl and aralkyl radicals, and in which both R's together may constitute a polymethylene radical forming, with the nitrogen atom to which they are attached, a heterocyclic ring; $R_1$ in Formula I being from the group consisting of hydrogen and acyl radicals; $R_2$ in Formula II being from the group consisting of hydrogen, the carbalkoxyl radicals and acyl radicals; $R_3$ in Formula II being from the group consisting of hydrogen and acyl radicals; and $R_4$ in Formula II being from the group consisting of hydrogen, alkyl and acyl radicals.

13. The method of claim 12 wherein the compound of Formula I is gramine and the compound of Formula II is hydantoin.

14. The method of claim 13 wherein gramine and hydantoin are heated together at a temperature from 100 to 200° C., in the presence of at least 2 moles of the compound from the group consisting of the anhydrides and acid chlorides, for each mole of gramine and hydantoin.

15. The method of claim 14 wherein gramine and hydantoin are heated in the presence of sodium acetate and acetic anhydride.

References Cited in the file of this patent

UNITED STATES PATENTS

| | | |
|---|---|---|
| 2,435,399 | Lwak et al. | Feb. 3, 1948 |
| 2,447,544 | Snyder et al. | Aug. 24, 1948 |
| 2,527,366 | Lwak et al. | Oct. 24, 1950 |
| 2,557,041 | Weisblat et al. | June 12, 1951 |
| 2,557,920 | White et al. | June 19, 1951 |
| 2,766,255 | Pfister et al. | Oct. 9, 1956 |

U. S. DEPARTMENT OF COMMERCE
PATENT OFFICE
CERTIFICATE OF CORRECTION

Patent No. 2,829,145 April 1, 1958

Ludwig G. Hartmann et al.

It is hereby certified that error appears in the printed specification of the above numbered patent requiring correction and that the said Letters Patent should read as corrected below.

Column 5, line 3, for "and R radicals" read --the R radicals--.

Signed and sealed this 27th day of May 1958.

(SEAL)
Attest:
KARL H. AXLINE

Attesting Officer

ROBERT C. WATSON
Commissioner of Patents